(12) United States Patent
Kirby

(10) Patent No.: US 11,667,584 B2
(45) Date of Patent: *Jun. 6, 2023

(54) COMPOSITIONS FOR EROSION AND MOLTEN DUST RESISTANT ENVIRONMENTAL BARRIER COATINGS

(71) Applicant: General Electric Company, Schenectady, NY (US)

(72) Inventor: Glen Harold Kirby, Liberty Township, OH (US)

(73) Assignee: General Electric Comapny, Schenectady, NY (US)

(*) Notice: Subject to any disclaimer, the term of this patent is extended or adjusted under 35 U.S.C. 154(b) by 349 days.

This patent is subject to a terminal disclaimer.

(21) Appl. No.: 16/877,552

(22) Filed: May 19, 2020

(65) Prior Publication Data

US 2020/0277237 A1 Sep. 3, 2020

Related U.S. Application Data

(62) Division of application No. 15/689,406, filed on Aug. 29, 2017, now Pat. No. 10,696,601.

(51) Int. Cl.
*C04B 41/52* (2006.01)
*C04B 41/50* (2006.01)
(Continued)

(52) U.S. Cl.
CPC ............ *C04B 41/52* (2013.01); *C04B 35/495* (2013.01); *C04B 41/009* (2013.01);
(Continued)

(58) Field of Classification Search
None
See application file for complete search history.

(56) References Cited

U.S. PATENT DOCUMENTS 6,777,093 B1 8/2004 Ojard et al.
6,902,836 B2 6/2005 Eaton et al.
(Continued)

FOREIGN PATENT DOCUMENTS

JP H08337468 A 12/1996
JP 3214308 B2 10/2001
(Continued)

OTHER PUBLICATIONS

European Office Action Corresponding to Application No. 18188148.3 dated Jan. 15, 2019.
(Continued)

*Primary Examiner* — Colin W. Slifka
(74) *Attorney, Agent, or Firm* — Dority & Manning, P.A.

(57) ABSTRACT

Compounds are generally provided, which may be particularly used to form a layer in a coating system. In one embodiment, the compound may have the formula: $A_xB_b Ln_{1-x-b}Hf_{1-t-d}Ti_tD_dMO_6$, where: A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; x is about 0.01 to about 0.99; b is 0 to about 0.5, with 1-x-b being 0 to about 0.99 such that Ln is present in the compound; Ln is a rare earth or a mixture thereof that is different than A; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

20 Claims, 2 Drawing Sheets

(51) Int. Cl.
*C09D 1/00* (2006.01)
*C04B 41/00* (2006.01)
*C04B 41/89* (2006.01)
*C04B 35/495* (2006.01)

(52) U.S. Cl.
CPC ......... *C04B 41/5072* (2013.01); *C04B 41/89* (2013.01); *C09D 1/00* (2013.01); C04B 2235/3217 (2013.01); C04B 2235/3224 (2013.01); C04B 2235/3225 (2013.01); C04B 2235/3227 (2013.01); C04B 2235/3229 (2013.01); C04B 2235/3232 (2013.01); C04B 2235/3241 (2013.01); C04B 2235/3244 (2013.01); C04B 2235/3251 (2013.01); C04B 2235/3262 (2013.01); C04B 2235/3272 (2013.01); C04B 2235/3275 (2013.01); C04B 2235/3286 (2013.01); C04B 2235/3287 (2013.01); C04B 2235/3298 (2013.01); C04B 2235/3409 (2013.01); C04B 2235/3418 (2013.01); C04B 2235/9607 (2013.01)

(56) References Cited

U.S. PATENT DOCUMENTS

| | | |
|---|---|---|
| 7,060,360 B2 | 6/2006 | Eaton et al. |
| 7,063,894 B2 | 6/2006 | Sun et al. |
| 7,740,960 B1 | 6/2010 | Zhu et al. |
| 8,343,589 B2 | 1/2013 | Kirby et al. |
| 8,501,840 B2 | 8/2013 | Kirby et al. |
| 8,673,400 B2 | 3/2014 | Kirby et al. |
| 9,139,480 B2 | 9/2015 | Raybould et al. |
| 2005/0079343 A1 | 4/2005 | Raybould et al. |
| 2014/0050930 A1 | 2/2014 | Das et al. |

FOREIGN PATENT DOCUMENTS

| | | |
|---|---|---|
| JP | 3235410 B2 | 12/2001 |
| JP | 3407523 B2 | 5/2003 |
| JP | 2010/235415 A | 10/2010 |

OTHER PUBLICATIONS

European Search Report Corresponding to Application No. 18188146.7 dated Jan. 15, 2019.

Holcombe et al., Survey study of low-expanding high-melting, mixed oxides, No. Y—1913. Oak Ridge Y-12 Plant, Tenn.(USA), 1974. https://www.osti.gov/scitech/servlets/purl/4309451.

Holcombe, Ternary tantalite compositions, Journal of Materials Science, vol. 14, No. 9, Sep. 1979, pp. 2255-2260.

John et al., Dielectric properties of nano crystalline $LnTiNbO_6$ (Ln = Ce, Pr, Nd, Sm, Gd, Dy, Er, Yb) ceramics, IOP Conference Series: Materials Science and Engineering, conference 1, vol. 73, 2015, pp. 1-5, (http://iopscience.iop.org/1757-899X/73/1/012011).

Solomon et al, Synthesis, characterization and properties of [$RE1-xRE'x$]$TiNbO6$ dielectric ceramics, Materials Chemistry and Physics, 2001, pp. 291-293.

Su et al., Phase relations, crystal structure, and phase transformation of $In_{1-\chi}Nb_{1-\chi}Ti_{2\chi}O_4$ ($0 \leq \chi < 0.45$) in $In_2O_3$—$Nb_2O_5$-$TiO_2$ system, Journal of Alloys and Compounds, 651, Aug. 2015, pp. 97-105.

Surendran et al., Microwave dielectric properties of $RETiTaO6$ (RE = La, Ce, Pr, Nd, Sm, Eu, Gd, Tb, Dy, Ho, Y, Er, Yb, Al, and In) ceramics, Journal of materials research, 17(10), Oct. 2002, pp. 2561-2566. ResearchGate, https://www.researchgate.net/publication/231917997.

Surendran et al, Tailoring the microwave dielectric properties of $GdTiNb1—xTax06$ and $Smi—xYxTiTaO6$ ceramics, Journal of the European Ceramic Society, vol. 23, No. 14, Essex, 2003, pp. 2489-2495.

US 11,667,584 B2

COMPOSITIONS FOR EROSION AND MOLTEN DUST RESISTANT ENVIRONMENTAL BARRIER COATINGS

CROSS REFERENCE TO RELATED APPLICATION

This Application is a divisional of U.S. patent application Ser. No. 15/689,406 now U.S. Pat. No. 10,696,601, entitled "COMPOSITIONS FOR EROSION AND MOLTEN DUST RESISTANT ENVIRONMENTAL BARRIER COATINGS", filed Aug. 29, 2017, which is incorporated herein by reference.

FIELD OF TECHNOLOGY

Embodiments of the present invention generally relate to environmental barrier coatings for ceramic components, along with methods of making the same.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from supper alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide, which results in dimensional loss of the material. For component applications of silicon-based substrates in turbine engines, such material loss can open up clearances and may lead to efficiency losses, and ultimately may lead to perforation of the component.

As such, an environmental barrier coating (EBC) is applied onto the surface of the ceramics to help protect the underlying component. Current materials commonly used for environmental barrier coatings on CMC's include celsian-phase barium strontium aluminosilicate (BSAS) and rare earth silicates. All of these materials are relatively stable in steam compared to the CMC and can prevent penetration of steam to the CMC if present as a dense coating layer.

However, these materials have varying resistance against molten environmental contaminant compositions, particularly those containing oxides of calcium, magnesium, aluminum, silicon, and mixtures thereof. Dirt, ash, and dust ingested by gas turbine engines, for instance, are often made up of such compounds, which often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot barrier coating surface, and thus cause damage to the EBC. For example, CMAS can form compositions that are liquid or molten at the operating temperatures of the turbines. The molten CMAS composition can dissolve the barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material.

In particular, molten dust reacts strongly with BSAS to form a low temperature eutectic and phases that are not stable in steam. Molten dust is less corrosive against rare earth silicates. Some rare earth silicates (e.g. those comprised of gadolinium, erbium, and yttrium) react with the molten dust to form highly refractory "apatite" phases. Others rare earth silicates allow CMAS penetration but do not suffer melt point suppression. All rare earth silicates, however, are mechanically weakened by their interaction with molten dust, such that subsequent erosion and impact events can more easily take off the coating.

A need exists, therefore, for coating compositions that are less susceptible to molten dust attack, and also less susceptible to subsequent gas erosion, particle erosion, and particle impact over the current state-of-the-art EBC materials.

BRIEF DESCRIPTION

Aspects and advantages will be set forth in part in the following description, or may be obvious from the description, or may be learned through practice of the invention.

Compounds are generally provided, which may be particularly used to form a layer in a coating system. In one embodiment, the compound may have the formula:

$$A_x B_b Ln_{1-x-b} Hf_{1-t-d} Ti_t D_d MO_6$$

where: A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; x is about 0.01 to about 0.99; b is 0 to about 0.5, with 1-x-b being 0 to about 0.99 such that Ln is present in the compound; Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

In one particular embodiment, the compound may be an aluminum containing hafnium tantalate having the formula:

$$Al_{1-x-y}A'_x A''_y HfTaO_6$$

where: A' is Er, Sm, or a mixture thereof; x is about 0.3 to about 0.45; A" is In, Ga, or a mixture thereof; y is about 0.15 to about 0.35; and (x+y) is about 0.5 to about 0.7.

In one particular embodiment, the compound may be an aluminum and erbium containing hafnium tantalate having the formula:

$$Al_{1-x-y}Er_x Ga_y HfTaO_6$$

where: x is about 0.4 to about 0.6; y is 0 to about 0.4; and (x+y) is about 0.5 to about 0.85.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
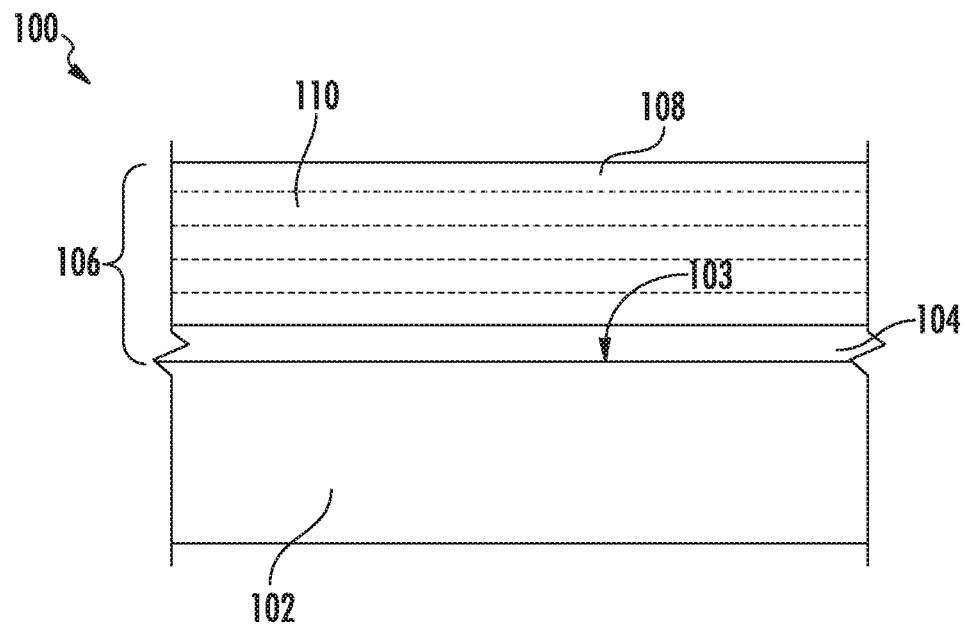
FIG. 1 shows an exemplary coated component having a substrate with a coating system thereon

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

Compositions are generally provided for use as part of an environmental barrier coating (EBC), along with methods of coating a component with such compositions. Additionally, coating systems are generally provided for use as an EBC coated on a surface of a substrate, along with there methods of formation and the resulting coated components.

Generally, the compositions described herein are less susceptible to molten dust, erosion, impact, and/or mixed mode degradation mechanisms than current EBC compositions. Thus, the compositions provided herein may result in a more robust EBC, compared to current-state-of-the-art EBC, that remains on the substrate material to protect it from recession against water vapor in turbine engine environments. In summary, these materials exhibit better resistance against molten dust as compared to BSAS and rare earth silicate EBC materials, and may have higher hardness than BSAS and rare earth silicate materials, particular after exposure to molten dust (e.g., CMAS). Thus, the compound add resistance to particle erosion and impact to a coating formed from such materials (e.g., an EBC).

Referring now to the drawings, FIG. 1 shows an exemplary coated component 100 with a substrate 102 having a coating system 106 thereon. Generally, the coating system 106 includes an optional bond coating 104 on the surface 103 of the substrate and an EBC 108 on the optional bond coating 104. In the embodiment shown, the bond coating 104 is directly on the surface 103 without any layer therebetween. However, in other embodiments, one or more layers can be positioned between the bond coating 104, when present, and the surface 103. In other embodiments, the EBC 108 may be formed directly on the surface 103 of the substrate 102.

The EBC 108 may include any combination of one or more layers 110 formed from materials selected from typical EBC or thermal barrier coating ("TBC") layer chemistries, including but not limited to rare earth silicates (e.g., monosilicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc.

In accordance with one particular embodiment, at least one of the layers 110 of the EBC 108 includes a compound having the formula:

$$A_{1-b}B_{b}Z_{1-d}D_{d}MO_{6} \qquad \text{(Formula 1)}$$

where A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as greater than 0 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. Compounds of Formula 1 may exhibit properties that are similar or better than existing BSAS and rare earth silicate materials in terms of stability in high temperature steam. Additionally, these materials may exhibit better resistance against molten dust as compared to BSAS and rare earth silicate EBC materials. Furthermore, these materials may have higher hardness than BSAS and rare earth silicate materials, particularly after exposure to molten dust. This results in the coating being more resistant to particle erosion and impact.

Generally, the compound having the Formula 1 may have multiple phases in the layer 110, such as an orthorhombic phase (e.g., with Pbcn or Pnma space groups), a tetragonal phase (e.g., with P4$_2$/mnm), or a monoclinic phase (e.g., with P2/c). As such, these materials may have a structure that is completely different (in terms of phase) than TBC layers formed from material containing hafnium oxides or zirconium oxides, which typically have the phase P21/c for monoclinic hafnia and monoclinic zirconia, or the phase P4$_2$/nmc for tetragonal hafnia and zirconia, or the cubic structure for hafnia and zirconia.

It is to be understood that the compound has distinct "sites" in its composition, with the "A site" being formed by A and/or B of Formula 1, the "Z site" being formed by Z and/or D of Formula 1, the "M site," and the oxygens.

In certain embodiment, the compound may include a single element in the "A site" such that b is 0 and A is of an element selected from the group consisting of Al, Ga, In, Sc, Y, Ce, Pr, Nd, Pm, Sm, Eu, Gd, Tb, Dy, Ho, Er, Tm, Yb, Lu, Fe, Cr, Co, Mn, and Bi. In one exemplary embodiment, when b is 0 and A is Al, the compound is: $AlZ_{1-d}D_dMO_6$ (e.g., $AlZMO_6$ when d is 0, such as $AlHfTaO_6$). In another exemplary embodiment, when b is 0 and A is Y, the compound has the formula: $YZ_{1-d}D_dMO_6$ (e.g., $YZMO_6$ when d is 0, such as $YHfTaO_6$). In still another exemplary embodiment, when b is 0 and A is Er, the compound has the formula: $ErZ_{1-d}D_dMO_6$ (e.g., $ErZMO_6$ when d is 0, such as $ErHfTaO_6$).

The "A site" of the compound having Formula 1 includes, in one particular embodiment, aluminum (Al) in combination with another A element (e.g., Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof). Without wishing to be bound by any particular theory, it is believed that the presence of Al in the compound increases the hardness of the coating. In certain embodiments, Al is present in combination with another element at the "A site" and then the compound can be described as having the formula:

$$Al_xA_{1-x-b}B_bZ_{1-d}D_dMO_6 \qquad \text{(Formula 2)}$$

where x is about 0.01 to about 0.99; A is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); Z is Hf, Ti, or a mixture thereof; D is Zr, Ce, Ge, Si, or a mixture thereof; d is 0 to about 0.5 (e.g., 0 to about 0.2, such as about 0.001 to about 0.5 or about 0.001 to about 0.2); and M is Ta, Nb, or a mixture thereof. In certain embodiments, x is about 0.05 to about 0.9, such as about 0.1 to about 0.75. In one particular embodiment, up to half of the element mixture at the A site of the compound of Formula 1 may be Al (e.g., x is about 0.1 to about 0.5 in the compound of Formula 2).

In addition to Al, the "A site" of the compound having Formula 1 includes, in one particular embodiment, a combination of Al and gallium (Ga), with or without the presence of another A element (e.g., In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof). Without wishing to be bound by any particular theory, it is believed that the presence of Ga in the compound reduces the average ionic radius of at the A site, which adjusts the coefficient of thermal expansion (CTE) of the layer 110. Thus, the amount of Ga in the compound may be used to control the CTE of the layer 110 to adjust it to be as close to the CTE of the adjacent layers within the coating system 106 and/or the CTE of the substrate 102.

When the compound includes Al and Ga in a portion of the "A site," then the compound can be descried as having the formula:

$$Al_xGa_yA_{1-x-y-b}B_bZ_{1-d}D_dMO_6 \qquad \text{(Formula 3)}$$

where x is about 0.01 to about 0.99 as described above with respect to Formula 2; y is about 0.01 to about 0.9; x+y is 1 or less; A is In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); Z is Hf, Ti, or a mixture thereof; D is Zr, Ce, Ge, Si, or a mixture thereof d is 0 to about 0.5 (e.g., 0 to about 0.2, such as about 0.001 to about 0.5 or about 0.001 to about 0.2); and M is Ta, Nb, or a mixture thereof. Another element may be present at the A site in the compound of Formula 3 when x+y is less than 1 (i.e., x+y>1). In one particular embodiment, up to half of the element mixture at the A site of the compound of Formula 1 may be Al (e.g., x is about 0.1 to about 0.5 in the compound of Formula 3) and up to half of the element mixture at the A site of the compound of Formula 1 may be Ga (e.g., y is about 0.1 to about 0.5 in the compound of Formula 3).

In particular embodiments, erbium (Er), yttrium (Y), and/or holmium (Ho) may be included within the A site of the compounds having the Formula 1, Formula 2, and/or Formula 3 (i.e., A includes Er, Y, Ho, or a mixture thereof in any of Formulas 1, 2, or 3). Without wishing to be bound by any particular theory, it is believed that the Er, Y, and/or Ho may provide CMAS resistance to the layer 110 formed from such a compound.

Referring to Formulas 1-3 where b is greater than 0, boron (B) dopes the "A site" of the compound of Formula 1 to change the CTE and/or the sintering temperature of the layer formed from the compound. Additionally, B may migrate to other layers (e.g., the bond coating and/or thermally growth oxide layer) to help those layers interact with CMAS and/or to control the crystalition of those layers. However, in other embodiments, b is 0 such that no B is present in the compound.

The "Z site" of any of the compounds having Formula 1, 2, or 3 may be utilized, in one particular embodiment, to help control the CTE of the compound. Generally, the CTE of the compound is directly proportional to the ionic radius of at Z site. For example, the CTE of the compound decreases as the ionic radius of the Z site element decreases. In particular embodiments, the Z site may include Hf, Ti, or a mixture thereof, such as represented in Formula 4:

$$A_{1-b}B_bHf_hTi_tD_{1-h-t}MO_6 \qquad \text{(Formula 4)}$$

where h is 0 to 1, t is 0 to 1, and h+t is greater than 0 to 1; A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; b is 0 to about 0.5 (e.g., 0 to about 0.2, such as about 0.001 to about 0.5 or about 0.001 to about 0.2); D is Zr, Ce, Ge, Si, or a mixture thereof; and M is Ta, Nb, or a mixture thereof. In one particular embodiment of Formula 4, the A site may include Al (e.g., as discussed above with respect to Formula 2), Ga (e.g., as discussed above with respect to Formula 3), and/or other materials, and/or B (e.g., as discussed above with respect to Formulas 1, 2, or 3). In certain embodiments, h+t may be greater than 0 but less than 1, such that another element (D) is present at the Z site.

In one embodiment, Hf is present in the compound such that h is greater than 0 to 1 (e.g., about 0.05 to about 1). In one particular embodiment when both Hf and Ti are present in the compound (i.e., both h and t are greater than 0), Hf may be present in a molar amount that is greater than the amount of Ti, such that h is greater than t. In one embodiment, Hf may be the majority of the element in terms of molar ration (i.e., h is 0.5 to 1) at the Z site. For example, h may be 1 in particular embodiments, such that t is 0 and 1-t is 0 (i.e., Hf is the sole element at the Z site). Without wishing to be bound by any particular theory, it is believed that Hf in the Z site may increase hardness and the steam resistance of the coating formed from such a compound.

In particular embodiments, where Hf is present in the "Z site" (i.e., Z includes Hf either alone or in combination with Ti and/or D), a combination of elements may be included in the "A site." For example, such a compound may have the formula:

$$A_x B_b Ln_{1-x-b} Hf_{1-t-d} Ti_t D_d MO_6 \quad \text{(Formula 5)}$$

where: A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; x is about 0.01 to about 0.99; b is 0 to about 0.5 with 1-x-b being 0 to about 0.99 such that Ln is present in the compound; Ln is Sc, Y, La, Ce, Pr, Nd, Pm, Sm, Eu, Gd, Tb, Dy, Ho, Er, Tm, Yb, Lu, or a mixture thereof, and with Ln being different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

When A includes Al in combination with another element, Formula 5 can be modified as follows:

$$Al_x A'_a B_b Ln_{1-x-a-b} Hf_{1-t-d} Ti_t D_d MO_6 \quad \text{(Formula 6)}$$

where: x is about 0.01 to about 0.99 such that Al is present in the compound; A' is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof; a is 0 to about 0.99; b is 0 to about 0.5, with 1-x-a-b being 0 to about 0.99 such that Ln is present in the compound; Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition; t is 0 to about 0.99; D is Zr, Ce, Ge, Si, or a mixture thereof; d is 0 to about 0.5; the sum of t and d is less than 1 such that Hf is present in the compound; and M is Ta, Nb, or a mixture thereof.

For example, both Al and Ga may be present at the A site in combination with another element (with Hf included in the Z site), such as in the formula:

$$Al_x Ga_y B_b Ln_{1-x-y-b} Hf_{1-t-d} Ti_t D_d MO_6 \quad \text{(Formula 7)}$$

where: x is about 0.01 to about 0.99 such that Al is present in the compound; y is about 0.01 to about 0.99 such that Ga is present in the compound; b is 0 to about 0.5, with 1-x-a-b being 0 to about 0.99 such that Ln is present in the compound; Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition; t is 0 to about 0.99; D is Zr, Ce, Ge, Si, or a mixture thereof d is 0 to about 0.5; the sum of t and d is less than 1 such that Hf is present in the compound; and M is Ta, Nb, or a mixture thereof.

The material of the "M site" of the compound of any of Formulas 1-7 may influence the phase allowance and CTE of the resulting compound. In one particular embodiment, the M site may be Nb without any additional element present, which may provide better phase allowance and CTE matching when utilized as a layer within an EBC coating.

As stated, the compound of any of Formulas 1-7 may be included in a layer of an EBC 108 of the coating system 106 so as to provide a material having minimal reaction with CMAS and has high hardness (e.g., for erosion resistance) after reaction with CMAS. Thus, the material of the compounds of any of Formulas 1-7 may be included within a layer of the EBC with other materials of an EBC layer, or may be used to form a separate layer within the EBC 108. In one embodiment, a layer of the EBC 108 is formed from the compound of any of Formulas 1-7, and may have a thickness of about 1 μm to about 1 mm (e.g., 1 μm to about 100 μm).

In one embodiment, the compound of any of Formulas 1-7 may be included in an outermost layer of an EBC 108 of the coating system 106, such that the compound may help protect the underlying EBC layers and substrate 102. The substrate 102 may be formed from a ceramic matrix composite ("CMC") material, such as a silicon based, non-oxide ceramic matrix composite. As used herein, "CMC" refers to a silicon-containing, or oxide-oxide, matrix and reinforcing material. As used herein, "monolithic ceramics" refers to materials without fiber reinforcement (e.g., having the matrix material only). Herein, CMCs and monolithic ceramics are collectively referred to as "ceramics."

Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

Particularly suitable compounds for use as a relatively thick or thin EBC layer may have a particularly close coefficient of thermal expansion (CTE) to the underlying CMC substrate. For example, aluminum containing hafnium tantalates may be particularly suitable compounds having CTEs relatively close to that of the CMC substrate. For example, aluminum containing hafnium tantalates may have the formula:

$$Al_{1-x-y} A'_x A''_y HfTaO_6 \quad \text{(Formula 8)}$$

where A' is Er, Sm, or a mixture thereof; x is about 0.3 to about 0.45; A'' is In, Ga, or a mixture thereof; y is about 0.15 to about 0.35; and (x+y) is about 0.5 to about 0.7 such that Al is present from about 0.3 to about 0.5. In particular embodiments, A' is either Er or Sm, and/or A'' is either In or Ga. The compound of Formula 8 may also be referring to from Formula 1 where (referring to Formula 1) A includes Al in combination with two other elements (A' and A'' of Formula 8); b is 0, Z is Hf, d is 0, and M is Ta.

Particularly suitable compounds for use as a relatively thin EBC layer (e.g. having a thickness of about 100 μm or less) may have a coefficient of thermal expansion (CTE) that is close to the CTE of the underlying CMC substrate but not within a CTE matching relations. For example, erbium containing hafnium tantalates may be particularly suitable compounds for such EBC layers, and may have the formula:

$$Al_{1-x-y} Er_x Ga_y HfTaO_6 \quad \text{(Formula 9)}$$

where x is about 0.4 to about 0.6; y is 0 to about 0.4; and (x+y) is about 0.5 to about 0.85 such that Al is present from about 0.15 to about 0.5. The compound of Formula 9 may also be referring to from Formula 1 where (referring to Formula 1) A includes a combination of Er, Al, and Ga; b is 0, Z is Hf, d is 0, and M is Ta.

As shown, the bond coating 104 is optionally positioned on the surface 103 of the substrate 102 between the substrate 102 and the EBC 108. When present, the bond coating 104 includes silicon or a silicon based material (e.g., a silicide, etc.). Generally, the bond coating 104 is relatively thin, such as having a thickness that is about 25 micrometers (μm) to about 275 μm, such as about 25 μm to about 150 μm (e.g., about 25 μm to about 100).

Figure 2:
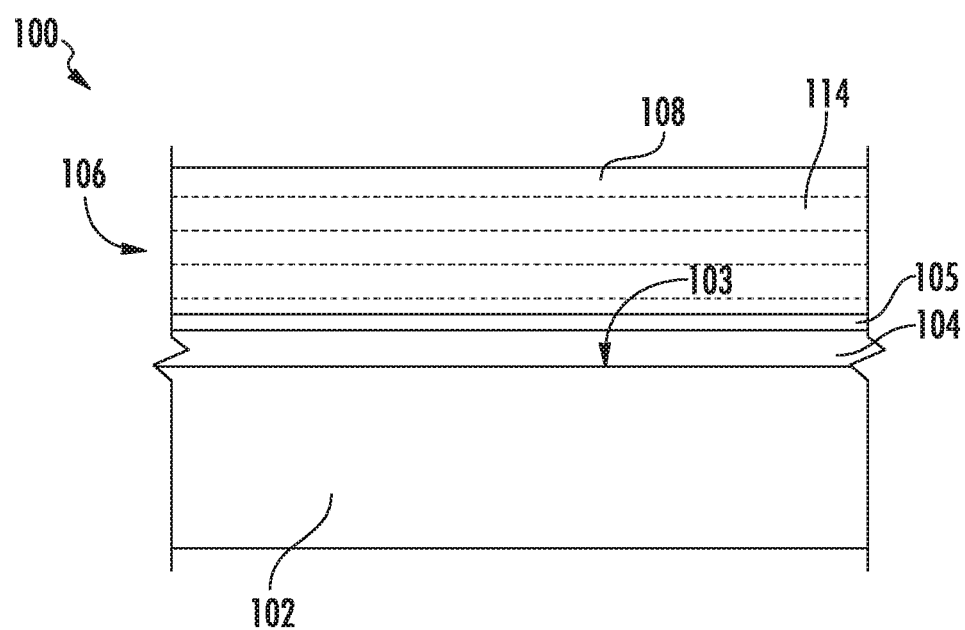
FIG. 2 shows an exemplary coated component having a substrate with a coating system thereon.

FIG. 2 shows a thermally grown oxide ("TGO") layer 105, which may form on the surface of the silicon-based bond coating 104, such as a layer of silicon oxide (sometimes referred to as "silicon oxide scale" or "silica scale"), during exposure to oxygen (e.g., during manufacturing and/or use) of the component 100.

The coated component 100 of FIG. 1 is particularly suitable for use as a component found in high temperature environments, such as those present in gas turbine engines, for example, combustor components, turbine blades, shrouds, nozzles, heat shields, and vanes. In particular, the turbine component can be a CMC component positioned within a hot gas flow path of the gas turbine such that the coating system 106 forms an environmental barrier for the underlying substrate 102 to protect the component 100 within the gas turbine when exposed to the hot gas flow path.

Figure 3:
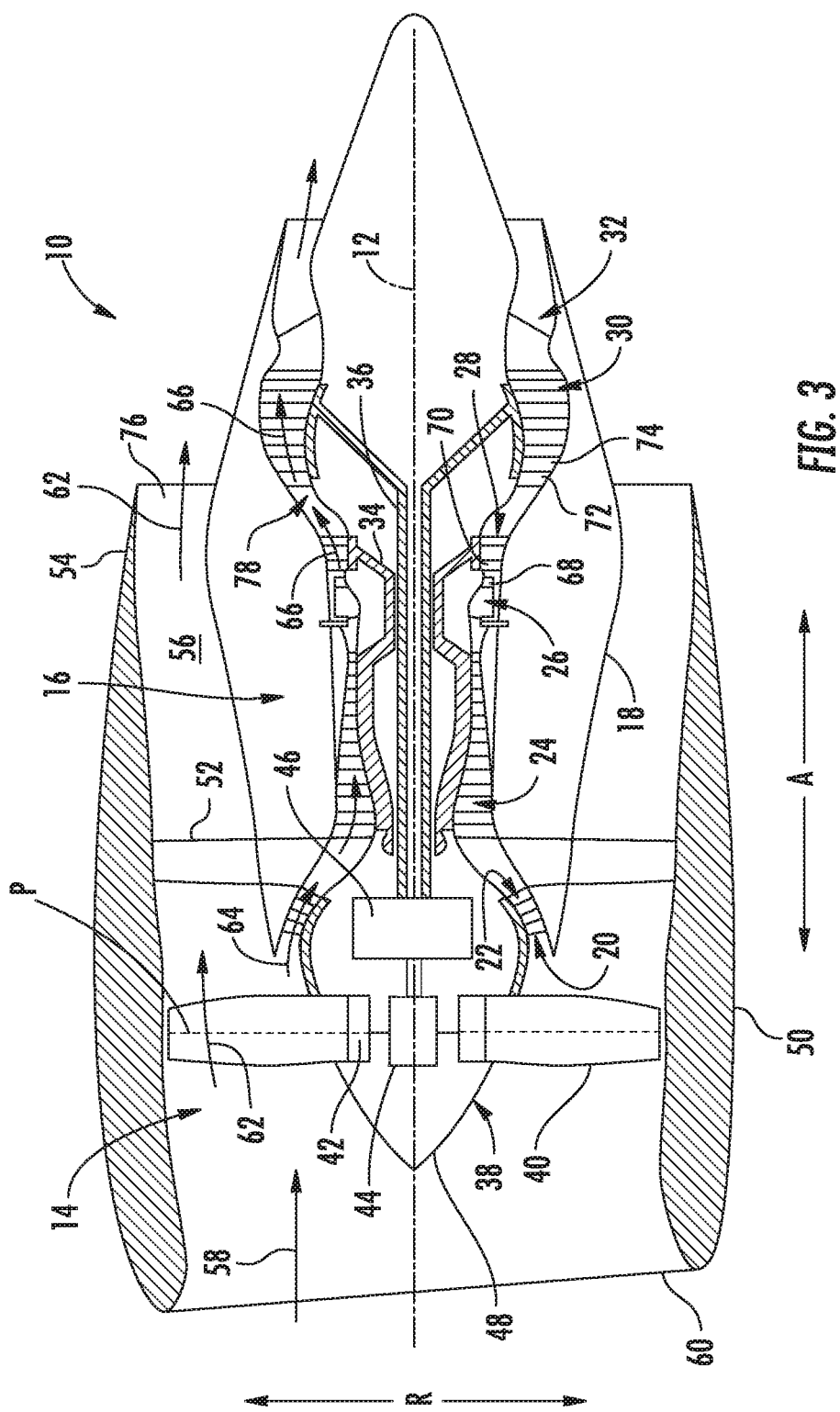
FIG. 3 is a schematic cross-sectional view of a gas turbine engine which may include the coated component of FIG. 1 therein.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 10, referred to herein as "turbofan engine 10." As shown in FIG. 3, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

Example 1

Aluminum containing hafnium tantalates, according to Formula 8, where made according to the formulas shown in Table 1. Each of these aluminum containing hafnium tantalate compounds had a CTE that was close to the CTE of a CMC substrate, making these compounds particularly suitable for use as a layer of a EBC coating system.

TABLE 1

| Compound | CTE ($\times 10^{-6}$/° F.) |
| --- | --- |
| $Er_{0.33}Al_{0.37}In_{0.3}HfTaO_6$ | 2.70 |
| $Sm_{0.43}Al_{0.4}Ga_{0.17}HfTaO_6$ | 1.98 |

TABLE 1-continued

| Compound | CTE (×10$^{-6}$/° F.) |
|---|---|
| $Sm_{0.29}Al_{0.42}In_{0.29}HfTaO_6$ | 1.81 |
| $Sm_{0.36}Al_{0.47}In_{0.17}HfTaO_6$ | 2.15 |

Example 2

Aluminum containing hafnium tantalates, according to Formula 9, where made according to the formulas shown in Table 2. Each of these aluminum containing hafnium tantalate compounds had a CTE that, while not being particularly close to the CTE of a CMC substrate, was still suitable for use as a thin layer of a EBC coating system.

TABLE 2

| Compound | CTE (×10$^{-6}$/° F.) |
|---|---|
| $Er_{0.48}Al_{0.2}Ga_{0.32}HfTaO_6$ | 3.88 |
| $Er_{0.557}Al_{0.443}HfTaO_6$ | 3.60 |

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A compound having the formula:

$$A_xB_bLn_{1-x-b}Hf_{1-t-d}Ti_tD_dMO_6$$

where:
A is Al, Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof;
x is about 0.01 to about 0.99;
b is 0 to about 0.5, with 1-x-b being greater than 0 to about 0.99 such that Ln is present in the compound;
Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition;
t is 0 to about 0.99;
D is Zr, Ce, Ge, Si, or a mixture thereof;
d is 0 to about 0.5;
the sum of t and d is less than 1 such that Hf is present in the compound; and
M is Ta, Nb, or a mixture thereof.

2. The compound of claim 1, wherein b is 0, and wherein x is about 0.05 to about 0.9.

3. The compound of claim 1, wherein b is greater than 0 to about 0.5, and wherein x is about 0.05 to about 0.9 with the sum of x and b being less than 1.

4. The compound of claim 1, wherein b is 0, and wherein t is 0.

5. The compound of claim 1, wherein b is 0, and wherein d is 0.

6. The compound of claim 1, where: b is 0; t is 0; and d is 0.

7. The compound of claim 6, where: M is Ta.

8. The compound of claim 1, where: M is Ta.

9. The compound of claim 1, where: M is Nb.

10. The compound of claim 1, where: M is a mixture of Ta and Nb.

11. The compound of claim 1, wherein A includes Al such that the compound has the formula:

$$A_xB_bLn_{1-x-b}Hf_{1-t-d}Ti_tD_dMO_6$$

where:
x is about 0.01 to about 0.99 such that Al is present in the compound;
A' is Ga, In, Sc, Y, Ce, Pr, Nd, Pm, Sm, Eu, Gd, Tb, Dy, Ho, Er, Tm, Yb, Lu, Fe, Cr, Co, Mn, Bi, or a mixture thereof;
a is 0 to about 0.99;
b is 0 to about 0.5, with 1-x-a-b being greater than 0 to about 0.99 such that Ln is present in the compound;
Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition;
t is 0 to about 0.99;
D is Zr, Ce, Ge, Si, or a mixture thereof;
d is 0 to about 0.5;
the sum of t and d is less than 1 such that Hf is present in the compound; and
M is Ta, Nb, or a mixture thereof.

12. The compound of claim 11, where: M is Ta.

13. The compound of claim 11, where: M is Nb.

14. The compound of claim 11, where: M is a mixture of Ta and Nb.

15. The compound of claim 1, wherein the compound has the formula $$A_xB_bLn_{1-x-b}Hf_{1-t-d}Ti_tD_dMO_6$$

where:
x is about 0.01 to about 0.99 such that Al is present in the compound;
y is about 0.01 to about 0.99 such that Ga is present in the compound;
b is 0 to about 0.5, with 1-x-a-b being greater than 0 to about 0.99 such that Ln is present in the compound;
Ln is Sc, Y, La, Ce, Pr, Nd, Pm, Sm, Eu, Gd, Tb, Dy, Ho, Er, Tm, Yb, Lu, or a mixture thereof, and wherein Ln is different than A in terms of composition;
t is 0 to about 0.99;
D is Zr, Ce, Ge, Si, or a mixture thereof;
d is 0 to about 0.5;
the sum of t and d is less than 1 such that Hf is present in the compound; and
M is Ta, Nb, or a mixture thereof.

16. The compound of claim 15, where: M is Ta.

17. The compound of claim 15, where: M is Nb.

18. The compound of claim 15, where: M is a mixture of Ta and Nb.

19. The compound as in claim 1, where Ln is Er, Y, Ho, or a mixture thereof.

20. The compound of claim 1, wherein t is 0, and wherein d is greater than 0 to about 0.25.

* * * * *